United States Patent
Oida et al.

(10) Patent No.: US 11,519,824 B2
(45) Date of Patent: Dec. 6, 2022

(54) WEAR AMOUNT ESTIMATION METHOD, WEAR AMOUNT ESTIMATION DEVICE, AND WEAR AMOUNT ESTIMATION PROGRAM

(71) Applicant: BRIDGESTONE CORPORATION, Tokyo (JP)

(72) Inventors: Shoji Oida, Tokyo (JP); Naoto Okazaki, Tokyo (JP); Takeshi Yano, Tokyo (JP); Tomotaka Sakiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 255 days.

(21) Appl. No.: 16/771,487

(22) PCT Filed: Dec. 13, 2018

(86) PCT No.: PCT/JP2018/045802
§ 371 (c)(1),
(2) Date: Jun. 10, 2020

(87) PCT Pub. No.: WO2019/117232
PCT Pub. Date: Jun. 20, 2019

(65) Prior Publication Data
US 2021/0080354 A1 Mar. 18, 2021

(30) Foreign Application Priority Data

Dec. 14, 2017 (JP) .............................. JP2017-239708

(51) Int. Cl.
*G01M 17/00* (2006.01)
*B64C 25/00* (2006.01)
(Continued)

(52) U.S. Cl.
CPC .............. *G01M 17/02* (2013.01); *B64C 25/36* (2013.01); *G01N 3/56* (2013.01); *B60C 11/246* (2013.01)

(58) Field of Classification Search
CPC ......... G01M 17/02; B64C 25/36; G01N 3/56; B60C 11/246
See application file for complete search history.

(56) References Cited

U.S. PATENT DOCUMENTS 6,212,947 B1   4/2001   Shimizu et al.
7,483,794 B2 *  1/2009  Bocquillon ............. B60C 11/24
                                                      702/41
(Continued)

FOREIGN PATENT DOCUMENTS

CN   102483372 A   5/2012
CN   104535523 A   4/2015
(Continued)

OTHER PUBLICATIONS

Jul. 23, 2021 Extended Search Report issued in European Patent Application No. 18888527.1.
(Continued)

*Primary Examiner* — Alexander Satanovsky
*Assistant Examiner* — Lynda Dinh
(74) *Attorney, Agent, or Firm* — Oliff PLC

(57) ABSTRACT

A wear amount estimation device estimates plural kinds of wear energy depending on each of an internal pressure of aircraft tires, a load acting on the aircraft tires, a velocity of an aircraft, a slip angle caused in the aircraft tires, and a braking force of the aircraft, in accordance with each of these elements and wear energy EFR of the aircraft tires in a state of a free rolling run The wear amount estimation
(Continued)

device estimates the wear amount wear of the aircraft tires in accordance with each of the calculated wear energy and a wear resistance R indicating a relationship between pre-determined wear energy and a predetermined wear amount.

7 Claims, 6 Drawing Sheets

(51) Int. Cl.
  *G01N 3/00* (2006.01)
  *B60C 11/00* (2006.01)
  *G01M 17/02* (2006.01)
  *B64C 25/36* (2006.01)
  *G01N 3/56* (2006.01)
  *B60C 11/24* (2006.01)

(56) References Cited

U.S. PATENT DOCUMENTS

| | | | |
|---|---|---|---|
| 9,156,451 B2 * | 10/2015 | Metzger, Jr. | .......... B60T 8/1703 |
| 2012/0197548 A1 | 8/2012 | Kuramoto et al. | |
| 2015/0375584 A1 | 12/2015 | Makino et al. | |
| 2016/0059955 A1 * | 3/2016 | Yoshida | .................. B60C 13/02 |
| | | | 152/523 |
| 2017/0113494 A1 | 4/2017 | Singh et al. | |

FOREIGN PATENT DOCUMENTS

| | | |
|---|---|---|
| EP | 2 472 243 A1 | 7/2012 |
| EP | 2 960 080 A1 | 12/2015 |
| FR | 2 816 402 A1 | 5/2002 |
| JP | H11-326145 A | 11/1999 |
| JP | 2001-001723 A | 1/2001 |
| JP | 4198610 B2 | 12/2008 |
| JP | 2013-113724 A | 6/2013 |
| JP | 2014-133527 A | 7/2014 |
| JP | 6112870 B2 | 4/2017 |
| JP | 2017-110976 A | 6/2017 |
| JP | 2017-156295 A | 9/2017 |

OTHER PUBLICATIONS

Aug. 20, 2021 Search Report issued in Chinese Patent Application No. 2018800806207.
Feb. 26, 2019 Search Report issued in International Patent Application No. PCT/JP2018/045802.

* cited by examiner ment data of a test device disclosed in Patent Literature 2, for example, when estimating the wear amount of the aircraft tires.

WEAR AMOUNT ESTIMATION METHOD, WEAR AMOUNT ESTIMATION DEVICE, AND WEAR AMOUNT ESTIMATION PROGRAM

This is a national phase of International Application No. PCT/JP2018/045802 filed Dec. 13, 2018, which is based upon and claims the benefit of priority from Japanese Patent Application No. 2017-239708, filed on Dec. 14, 2017, the entire contents of which are incorporated herein by reference.

TECHNICAL FIELD

The present invention relates to a wear amount estimation method, a wear amount estimation device, and a wear amount estimation program.

BACKGROUND ART

A technique is known that estimates a wear amount of aircraft tires (for example, Patent Literature 1). The method disclosed in Patent Literature 1 acquires plural kinds of wear energy corresponding to plural running states (such as a touching down state, a deceleration state after touching down, and a taxiing state) classified depending on the conditions of use, and estimates the wear amount of the respective aircraft tires based on the acquired wear energy. The method disclosed in Patent Literature 1 uses measurement data of a test device disclosed in Patent Literature 2, for example, when estimating the wear amount of the aircraft tires.

CITATION LIST

Patent Literature

Patent Literature 1: Japanese Unexamined Patent Application Publication No. 2013-113724
Patent Literature 2: Japanese Patent No. 4198610

SUMMARY OF INVENTION

The method disclosed in Patent Literature 1 still may not be able to accurately estimate the wear amount of the respective aircraft tires in the situation in which the aircraft tires are actually used. The reason for this is that, in the situation in which the aircraft tires are actually used, the wear amount of the aircraft tires typically greatly varies depending on the state of the ground surface in each airport, a distance necessary for taxiing, a frequency of circling, a total weight of an aircraft body, and the position of the center of gravity of the aircraft body which changes due to seating positions of passengers or baggage, for example. The method disclosed in Patent Literature 1 thus cannot accurately estimate the wear amount of the respective aircraft tires in the situation in which the aircraft tires are actually used if the measurement data does not include these pieces of information.

To solve the conventional problem described above, the present invention provides a wear amount estimation method, a wear amount estimation device, and a wear amount estimation program capable of accurately estimating a wear amount of aircraft tires in a situation in which the aircraft tires are actually used.

Technical Solution

A wear amount estimation method according to the present invention calculates wear energy $E_P$, which depends on an internal pressure of the aircraft tires, in accordance with the internal pressure and wear energy $E_{FR}$ of the aircraft tires in a state of a free rolling run. The wear amount estimation method calculates wear energy $E_L$, which depends on a load acting on the aircraft tires, in accordance with the load and the wear energy $E_{FR}$. The wear amount estimation method calculates wear energy $E_V$, which depends on a velocity of the aircraft, in accordance with the velocity and the wear energy $E_{FR}$. The wear amount estimation method calculates wear energy $\Delta E_S$, which depends on a slip angle caused in the aircraft tires, in accordance with the slip angle and the wear energy $E_{FR}$. The wear amount estimation method calculates wear energy $\Delta E_B$, which depends on a braking force of the aircraft, in accordance with the braking force and the wear energy $E_{FR}$. The wear amount estimation method estimates the wear amount wear of the aircraft tires in accordance with the wear energy $E_P$, the wear energy $E_L$, the wear energy $E_V$, the wear energy $\Delta E_S$, the wear energy $\Delta E_B$, and a wear resistance R indicating a relationship between predetermined wear energy and a predetermined wear amount.

Advantageous Effects

The present invention can accurately estimate the wear amount of the aircraft tires in a situation in which the aircraft tires are actually used.

DESCRIPTION OF EMBODIMENTS

Figure 1A:
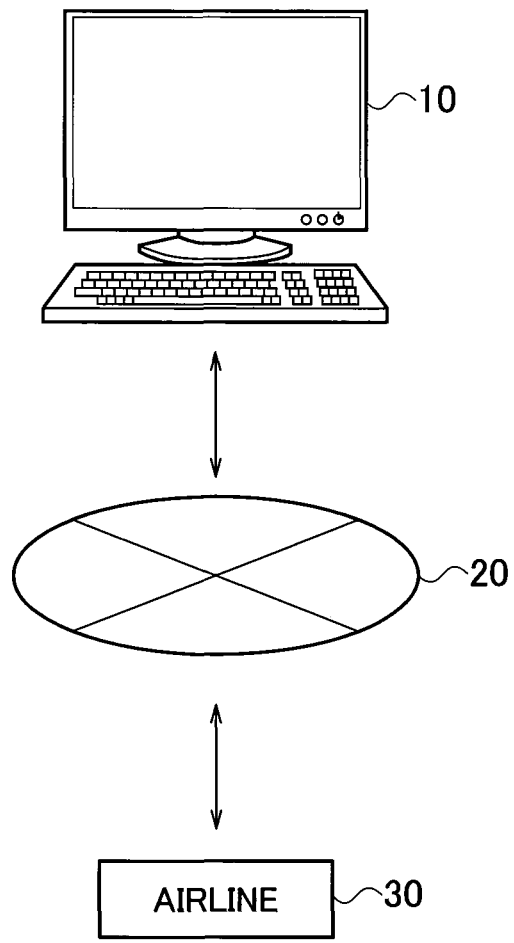
FIG. 1A is a schematic view showing a relation between a wear amount estimation device, a network, and an airline.

Hereinafter, an embodiment according to the present invention will be described with reference to the drawings.

The same elements illustrated in the drawings are indicated by the same reference numerals, and overlapping explanations are not made below.

Figure 1B:
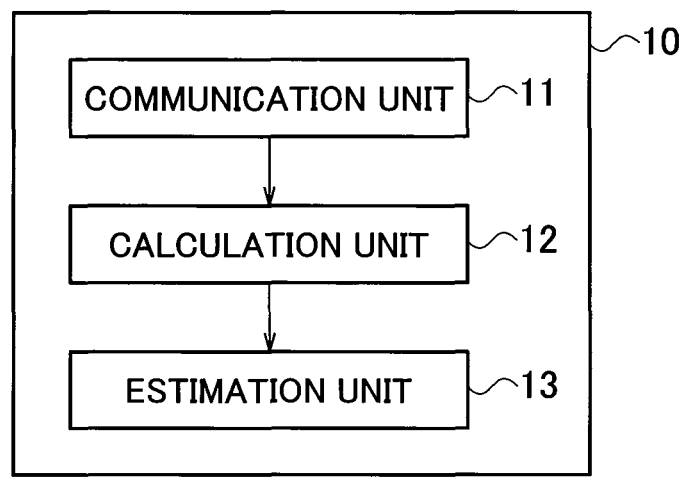
FIG. 1B is a schematic configuration diagram of the wear amount estimation device according to the present embodiment of the present invention.

As illustrated in FIG. 1A, a wear amount estimation device 10 is a general-purpose computer, for example, including a processor including a CPU and a memory such as a read-only memory (ROM) and a random-access memory (RAM). The CPU reads out a program stored in the ROM to the RAM and executes the program. The wear amount estimation device 10 may be either a built-in terminal device or a mobile terminal device easy to carry (such as a smartphone). The wear amount estimation device 10 includes a communication unit 11, a calculation unit 12, and an estimation unit 13, as illustrated in FIG. 1B. The communication unit 11 is an interface connected to a network 20 to transfer/receive pieces of data to communicate with an airline 30. The calculation unit 12 calculates wear energy. The estimation unit 13 estimates the wear amount of aircraft tires. The communication unit 11, the calculation unit 12, and the estimation unit 13 can be fabricated in single or plural processing circuits. The respective processing circuits include a programmed processing device, such as a processing device including an electric circuit. The respective processing circuits include an application-specific integrated circuit (ASIC) configured to execute the functions described above or a device including circuit components.

The wear amount estimation device 10 mutually communicates with the airline 30 via the network 20. The wear amount estimation device 10 acquires pieces of information from the airline 30 via the network 20 to estimate the wear amount of the aircraft tires mounted on an aircraft. The information that the wear amount estimation device 10 acquires from the airline 30 will be described below. As used herein, the aircraft may be simply referred to as a "body". The network 20 is a communications network capable of communicating various kinds of information. For example, the network is implemented by various types of communication lines, such as dedicated lines installed by telecommunications carriers, public switched telephone networks, satellite communication lines, and mobile communication lines.

Figure 2:
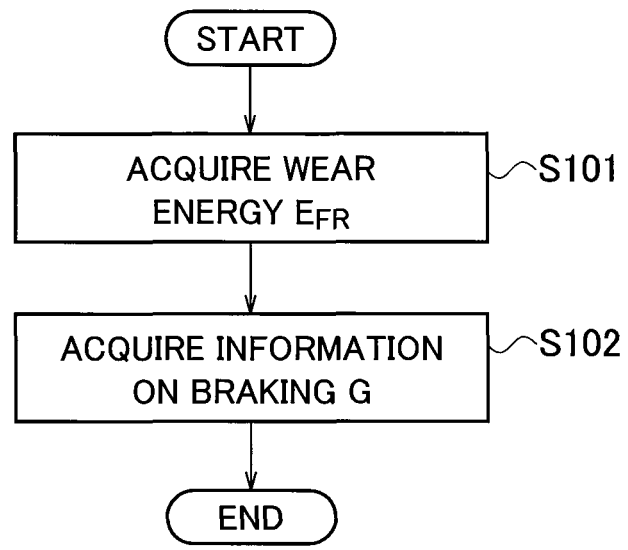
FIG. 2 is a flowchart for illustrating an operation of the wear amount estimation device according to the present embodiment of the present invention.

An example of operation of the wear amount estimation device 10 is described below with reference to FIG. 2.

In step S101, the wear amount estimation device 10 acquires wear energy $E_{FR}$ of the aircraft tires during taxiing.

The term "taxiing" refers to a state in which the aircraft runs on the ground (mainly a runway) under the power of the aircraft. The state of taxiing includes a state of a free rolling run, a state of a decelerating run, and a state of a circling run. The state of the free rolling run refers to a state in which the aircraft runs straight by rolling without braking force acting on the aircraft tires. The state of the decelerating run refers to a running state when the braking force is applied to the aircraft tires. The state of the circling run refers to a running state when a slip angle is applied to the aircraft tires.

The wear energy $E_{FR}$ is energy per unit area produced at a particular point on the surface of the corresponding aircraft tire when the aircraft tire passes through a road surface once, and its unit is $J/m^2$. The wear energy $E_{FR}$ is particularly wear energy during the state of the free rolling run. The wear amount estimation device 10 may acquire the wear energy $E_{FR}$ through laboratory testing, or may acquire the wear energy $E_{FR}$ by a finite element method (FEM).

Figure 3:
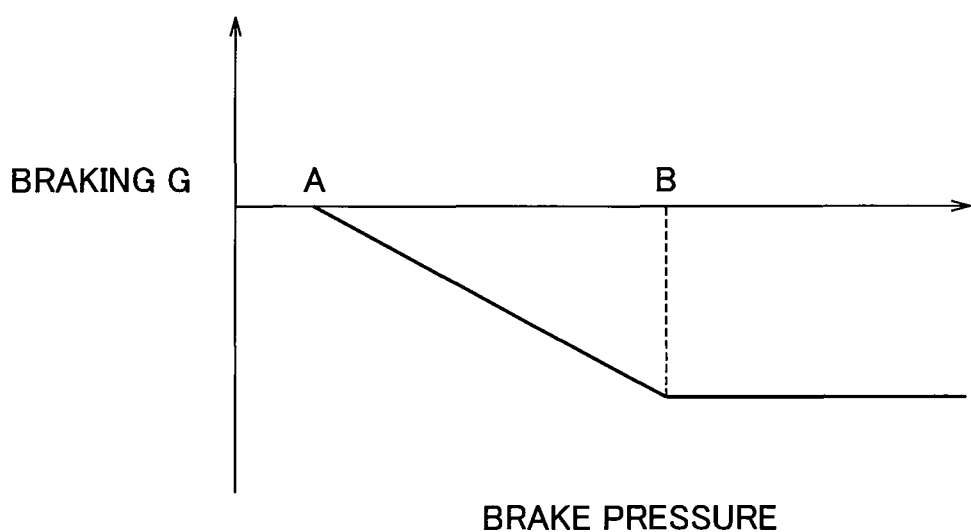
FIG. 3 is a graph showing a relationship between braking G and a brake pressure.

The process proceeds to step S102, and the wear amount estimation device 10 acquires information on braking G acting on the body of the aircraft. In particular, the wear amount estimation device 10 acquires information about the braking G acting on the body and a brake signal. The brake signal refers to a brake pressure regarding a hydraulic brake. The braking force of the body is not achieved only with the aircraft tires, which is different from typical automobiles. The braking G of the body does not correspond to the braking G acting on the aircraft tires. The wear amount estimation device 10 thus obtains the braking G applied to the aircraft tires so as to estimate the wear amount of the aircraft tires. As shown in FIG. 3, a predetermined value A is a point at which the braking force of a brake and a propulsive force of an engine are balanced, while the braking G is not led to any negative number when the brake pressure is the predetermined value A or smaller. The braking G does not change when the brake pressure of a predetermined value 13 or greater is applied. This braking force of the brake is given by the following function represented by the formula A1:

[Math. 1]

$$G_x^{BR} = \min(0, \max(G_{max}^{BR}, f(BP))) \tag{A1}$$

where BP is the brake pressure, and $G_{MAX}^{BR}$ is the maximum braking G of the brake. $G_{MAX}^{BR}$ is normally a negative number.

The braking force of the brake is given by the following function represented by the formula A2 when subjected to a linear approximation as shown in FIG. 3:

[Math. 2]

$$G_x^{BR} = \min(0, \max(G_{max}^{BR}, a \times BP + b)) \tag{A2}$$

where a and b are constants assigned to each body.

The wear amount estimation device 10 can calculate the braking G acting on the aircraft tires according to the above formula A2 at a predetermined timing. While the above process has been illustrated with the hydraulic brake, the aircraft is not limited to the hydraulic brake to be equipped. The aircraft may be equipped with an electric brake. The wear amount estimation device 10 can also calculate the braking G when the aircraft tire is equipped with an electric brake in the same manner as described above.

Figure 4:
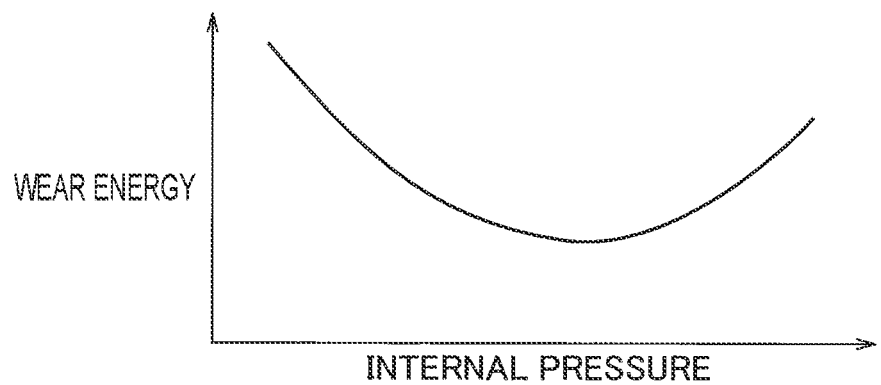
FIG. 4 is a graph showing a relationship between an internal pressure of an aircraft tire and wear energy.

The wear amount estimation device 10 according to the present embodiment changes the internal pressure of the aircraft tires on the basis of the wear energy $E_{FR}$ during the state of the free rolling run, and acquires wear energy $E_P$ which depends on the internal pressure. As shown in FIG. 4, the wear energy $E_P$ is represented by a quadratic function. A relationship between ribs formed on the aircraft tires and the wear energy $E_{FR}$ is described below with reference to FIG. 9. While the following explanation is made with regard to the aircraft tires for a main gear illustrated in FIG. 9, the same is also applied to the aircraft tires for a nose gear.

Figure 9:
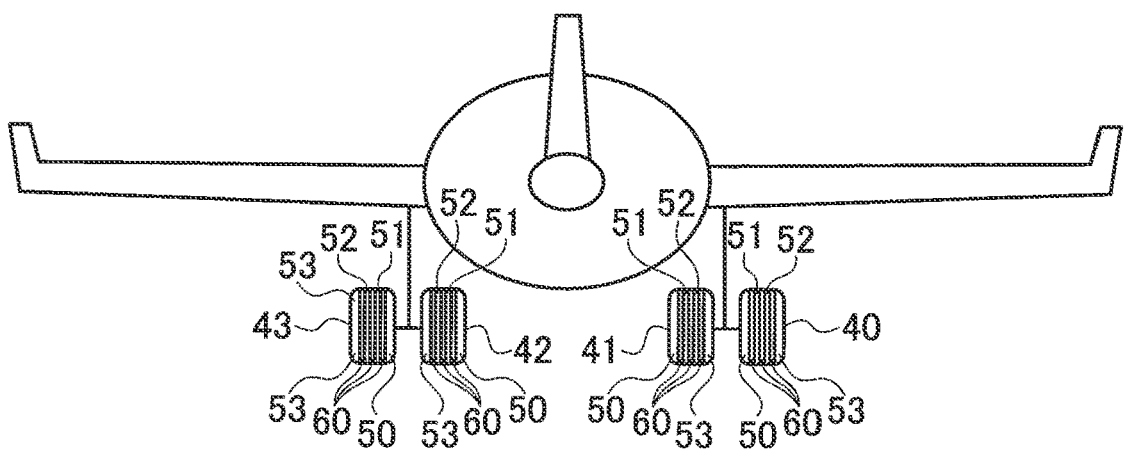
FIG. 9 is a back view illustrating circumferential grooves and ribs provided on the aircraft tires.

As illustrated in FIG. 9, the respective aircraft tires 40 to 43 are provided with a plurality of circumferential grooves 60 (three in FIG. 9) extending in the tire circumferential direction on the tread track, and are provided with a plurality of ribs (four in FIGS. 9) 50 to 53 defined by the respective circumferential grooves 60. The ribs 50, 51, 52, and 53 are arranged in this order from the central side to the outer side of the body. The wear energy $E_{FR}$ varies depending on the positions of the ribs. The wear amount estimation device 10 then acquires the wear energy $E_{FR}$ of the respective ribs 50 to 53 of one aircraft tire. The wear amount estimation device 10 may acquire, as the wear energy $E_{FR}$, an average value of the wear energy $E_{FR}$ regarding the rib 50 closest to the central side and the wear energy $E_{FR}$ regarding the rib 53 on the outermost side.

The wear energy $E_P$, which depends on the internal pressure of the aircraft tires, also varies depending on the positions of the ribs shown in FIG. 9. When the positions of the ribs of the aircraft tires are represented by use of a variable i in the state in which the aircraft tires are mounted on the aircraft, the wear energy $E_P$ is given by the following formula A3:

[Math. 3]

$$E_P^i(P) = a_P P^2 + b_P P + c_P \qquad (A3)$$

where i is the position of each rib of the aircraft tire, P is the internal pressure of the aircraft tire, and $a_P$, $b_P$, and $c_P$ are constants.

Figure 5:
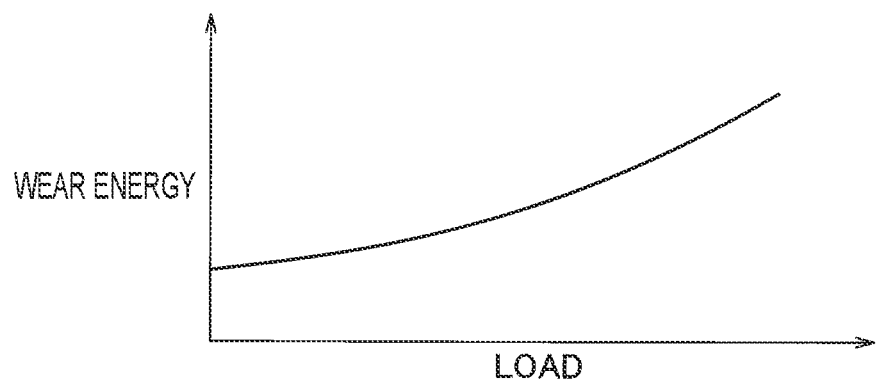
FIG. 5 is a graph showing a relationship between a load acting on the aircraft tire and the wear energy.

The wear amount estimation device 10 also changes the load applied to the aircraft tires on the basis of the wear energy $E_{FR}$ during the state of the free rolling run, and acquires wear energy $E_L$ which depends on the load. As shown in FIG. 5, the wear energy $E_L$ is represented by a quadratic function. The wear energy $E_L$ also varies depending on the positions of the ribs shown in FIG. 9, as in the case of the wear energy $E_P$. When the positions of the ribs of the aircraft tires are represented by use of the variable i in the state in which the aircraft tires are mounted on the aircraft, the wear energy $E_L$ is given by the following formula A4:

[Math. 4]

$$E_L^i(L) = a_L L^2 + b_L L + c_L \qquad (A4)$$

where i is the position of each rib of the aircraft tire, L is the load applied to the aircraft tire, and $a_L$, $b_L$, and $c_L$ are constants.

Figure 6:
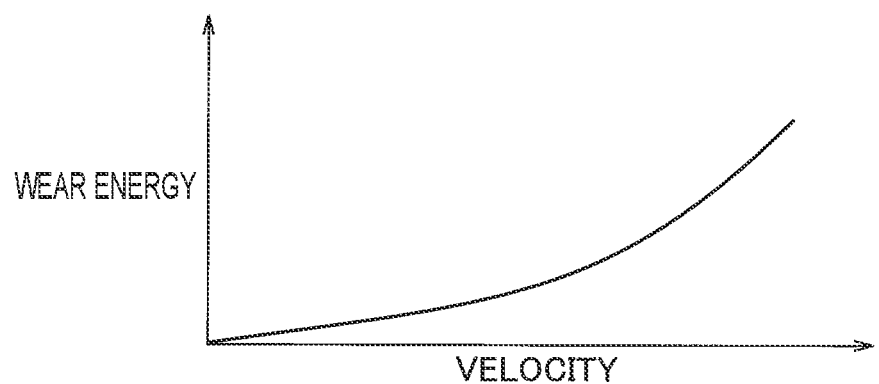
FIG. 6 is a graph showing a relationship between a velocity of the aircraft and the wear energy.

The wear amount estimation device 10 also changes the velocity of the aircraft on the basis of the wear energy $E_{FR}$ during the state of the free rolling run, and acquires wear energy $E_V$ which depends on the velocity. As shown in FIG. 6, the wear energy $E_V$ is represented by a quadratic function. The wear energy $E_V$ also varies depending on the positions of the ribs shown in FIG. 9, as in the case of the wear energy $E_P$. When the positions of the ribs of the aircraft tires are represented by use of the variable i in the state in which the aircraft tires are mounted on the aircraft, the wear energy $E_L$ is given by the following formula A5:

[Math. 5]

$$E_V^i(V) = a_V V^2 + b_V V + c_V \qquad (A5)$$

where i is the position of each rib of the aircraft tire, V is the velocity of the aircraft, and $a_V$, $b_V$, and $c_V$ are constants.

Figure 7:
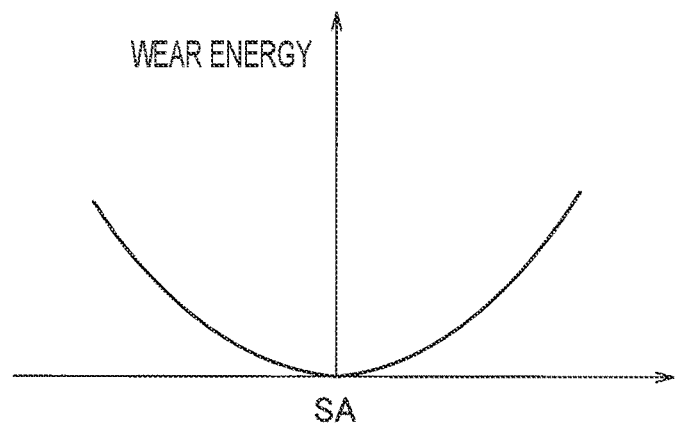
FIG. 7 is a graph showing a relationship between a slip angle caused in the aircraft tire and the wear energy.

The wear amount estimation device 10 also changes the slip angle (SA) of the aircraft tires, and acquires wear energy $E_S$ depending on the SA as a difference from the wear energy $E_{FR}$ in the state of the free rolling run. As shown in FIG. 7, the wear energy $E_S$ is represented by a quadratic function. The wear energy $E_S$ also varies depending on the positions of the ribs shown in FIG. 9, as in the case of the wear energy $E_P$. When the positions of the ribs of the aircraft tires are represented by use of the variable i in the state in which the aircraft tires are mounted on the aircraft, the wear energy $E_S$ is given by the following formula A6:

[Math. 6]

$$\Delta E_S^i(SA) = a_S(SA)^2 + b_S(SA) + c_S - E_{FR} \qquad (A6)$$

where i is the position of each rib of the aircraft tire, SA is the slip angle, and $a_S$, $b_S$, and $c_S$ are constants.

Figure 8:
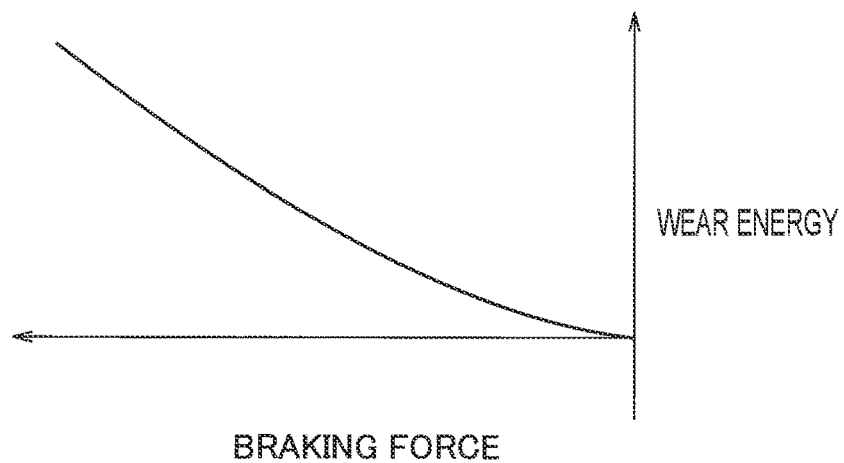
FIG. 8 is a graph showing a relationship between a braking force of the aircraft and the wear energy.

The wear amount estimation device 10 also changes the braking force of the aircraft, and acquires wear energy $E_B$ depending on the breaking force as a difference from the wear energy $E_{FR}$ in the state of the free rolling run. As shown in FIG. 8, the wear energy $E_B$ is represented by a quadratic function. The wear energy $E_B$ also varies depending on the positions of the ribs shown in FIG. 9, as in the case of the wear energy $E_P$. When the positions of the ribs of the aircraft tires are represented by use of the variable i in the state in which the aircraft tires are mounted on the aircraft, the wear energy $E_B$ is given by the following formula A7:

[Math. 7]

$$\Delta E_B^i(G_x^{BR}) = a_B(G_x^{BR})^2 + b_B(G_x^{BR}) + c_B - E_{FR} \qquad (A7)$$

where i is the position of each rib of the aircraft tire, $G_x^{BR}$ is the braking force of the aircraft, and $a_B$, $b_B$, and $c_B$ are constants.

Next, an example of an estimating process of the wear amount estimation device 10 is described below with reference to FIG. 10. The estimating process of the wear amount estimation device 10 includes six steps (step S201 to step S206).

In step S201, the wear amount estimation device 10 acquires pieces of information on the aircraft from the airline 30. In particular, the wear amount estimation device 10 acquires the velocity of the aircraft, the acceleration of the aircraft, the current position of the aircraft, the direction of the nose of the aircraft, the total weight of the aircraft, the internal pressure and the positions of the ribs of the respective aircraft tires mounted on the aircraft, the brake pressure of the aircraft, the circling angle of the body, the circling radius of the body, and the steering angle of the steering wheel, for example. The wear amount estimation device 10 also acquires the time when the respective pieces of the information are acquired.

The process proceeds to step S202, and the wear amount estimation device 10 calculates a wheel load (a load) of the aircraft tires. The wheel load of the aircraft tires is obtained from a static load and a dynamic load.

The wear amount estimation device 10 first calculates the position of the center of gravity of the body when calculating the wheel load of the aircraft tires. The position of the center of gravity of the body varies depending on the seating positions of passengers or baggage. In the technical field of aircrafts, a method is known that confirms the weight and the position of the center of gravity in accordance with the provisions of the law (the aviation law). The position of the center of gravity during flight can be measured relative to a mean aerodynamic chord (MAC), so as to calculate the position of the center of gravity in association with the positional information of the MAC. For example, when the position of the center of gravity is calculated with a coordinate system based on the nose gear, the position of the center of gravity of the body can be calculated according to the mathematical expression of L1+L2×% MAC, where L1 is a distance from the nose gear to the front edge of the MAC position, and L2 is a MAC length of the body. L1 and L2 can be typically obtained from the body specifications. In addition, % MAC is available as the information prescribed in the aviation law.

Figure 11:
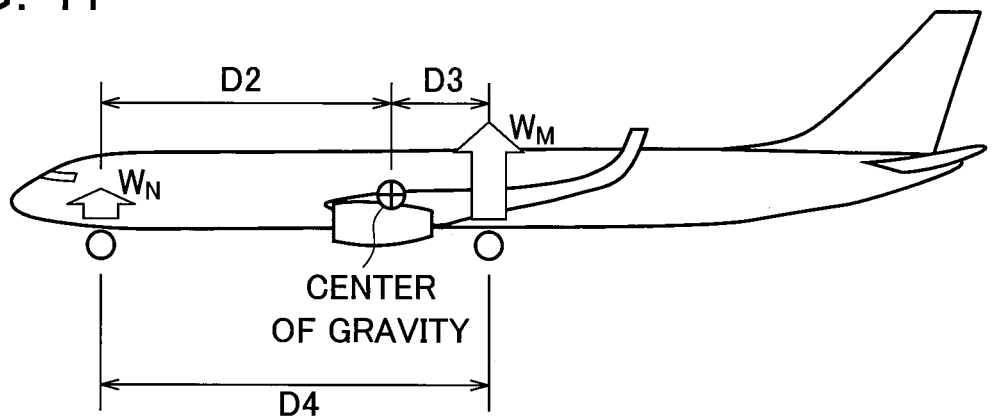
FIG. 11 is a side view for illustrating a static load of the aircraft.

The static load of the aircraft tires is described below with reference to FIG. 11. When the influence of the velocity of the aircraft is small, such as the state of taxiing, namely, when the influence of a lifting force can be ignored, the static load is calculated in accordance with a balance of a moment about the center of gravity acting on the body. As illustrated in FIG. 11, the total weight $W_N$ of the nose gear is represented by the following formula A8:

[Math. 8]
$$W_N = W \times \frac{D3}{D4} \quad (A8)$$

where W is the total weight of the body, D3 is a distance from the position of the center of gravity to the main gear, and D4 is a distance from the nose gear to the main gear.

Similarly, as illustrated in FIG. 11, the total weight $W_M$ of the main gear is represented by the following formula A9:

[Math. 9]
$$W_M = W \times \frac{D2}{D4} \quad (A9)$$

where D2 is a distance from the nose gear to the position of the center of gravity.

When the load applied to the aircraft tires is presumed to be distributed evenly, the wheel load of the respective aircraft tires mounted on the nose gear is obtained by dividing the total weight $W_N$ by the number of the tires mounted on the nose gear. In addition, the wheel load of the respective aircraft tires mounted on the main gear is obtained by dividing the total weight $W_M$ by the number of the tires mounted on the main gear. When there is measurement data on the wheel load, the distribution is preferably made according to the data.

The lifting force $G_{lift}$ is generated depending on the velocity when the aircraft takes off, which is represented by the following formula A10:

[Math. 10]
$$G_{lift} = cV^2 \quad (A10)$$

where c is a constant, and v is the velocity of the aircraft.

The acceleration in the vertical direction measured in the body of the aircraft when taking off gradually decreases as the aircraft accelerates. As in the case of the braking G described in step S102 shown in FIG. 2, a relationship between the acceleration of the body in the vertical direction and the square of the velocity is preliminarily obtained, so as to calculate the total weight W that the aircraft tires bear during takeoff. The total weight W that the aircraft tires bear during takeoff is represented by the following formula A11:

[Math. 11]
$$W = M(1 - G_{lift}) \quad (A11)$$

where M is the total weight of the body, which is the same value as W in the unit system of kg and kgf.

The dynamic load of the aircraft tires is described below with reference to FIG. 12 and FIG. 13. A load shift due to the acceleration in the front-rear direction acting on the center of gravity of the body is first described below with reference to FIG. 12.

Figure 12:
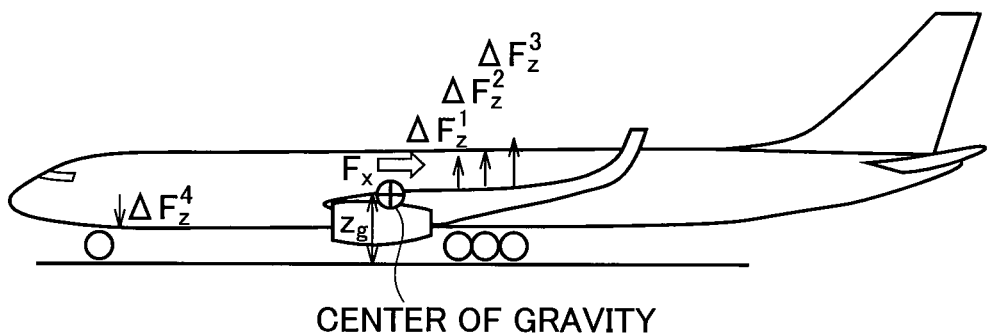
FIG. 12 is a side view for illustrating a dynamic load of the aircraft.

As illustrated in FIG. 12, when a load change of the respective aircraft tires is represented by $\Delta F_z^j$ (j: the mounted position of each aircraft tire), the following formula A12 and formula A13 need to be fulfilled in view of the balance of the acceleration in the front-rear direction of the body with the moment, and the total weight of the body which is constant:

[Math. 12]
$$z_g F_x = \Sigma_{j=1}^N \Delta F_z^j x^j \quad (A12)$$

[Math. 13]
$$\Sigma_{j=1}^N \Delta F_z^j = 0 \quad (A13)$$

where j is the mounted position of each aircraft tire, N is the total number of the aircraft tries mounted on the main gear, Zg is the distance from the ground to the position of the center of gravity, and Fx is the moment due to the acceleration in the front-rear direction of the body.

When the load shift is presumed to be proportional to the position in the front-rear direction, the load change $\Delta F_z^j$ is represented by the following formula A14:

[Math. 14]
$$\Delta F_z^j = \alpha_x x_j + \beta_x \quad (A14)$$

Since the total weight of the aircraft is constant, the following formula A15 and formula A16 are fulfilled:

[Math. 15]
$$\sum_{j=1}^N \Delta F_z^j = \alpha_x \sum_{j=1}^N x^j + N\beta_x = 0 \quad (A15)$$

[Math. 16]
$$\beta_x = -\frac{\alpha_x \sum_{j=1}^N x^j}{N} \quad (A16)$$

The following formula A17 and formula A18 are fulfilled due to the balance of the moment:

[Math. 17]
$$z_g F_x = \sum_{j=1}^N \Delta F_z^j x^j = \alpha_x \sum_{j=1}^N (x^j)^2 - \frac{\alpha_x}{N}\left(\sum_{j=1}^N x^j\right)^2 = \alpha_x \left\{\sum_{j=1}^N (x^j)^2 - \frac{1}{N}\left(\sum_{j=1}^N x^j\right)^2\right\} \quad (A17)$$

[Math. 18]
$$\alpha_x = \frac{z_g F_x}{\left\{\sum_{j=1}^N (x^j)^2 - \frac{1}{N}\left(\sum_{j=1}^N x^j\right)^2\right\}} \quad (A18)$$

As described above, the wear amount estimation device 10 can calculate the load variation at the position of the corresponding aircraft tire caused by the acceleration in the front-rear direction of the body.

A load shift due to the acceleration in the right-left direction (the lateral direction) acting on the center of gravity of the body is then described below with reference to FIG. 13.

Figure 13:
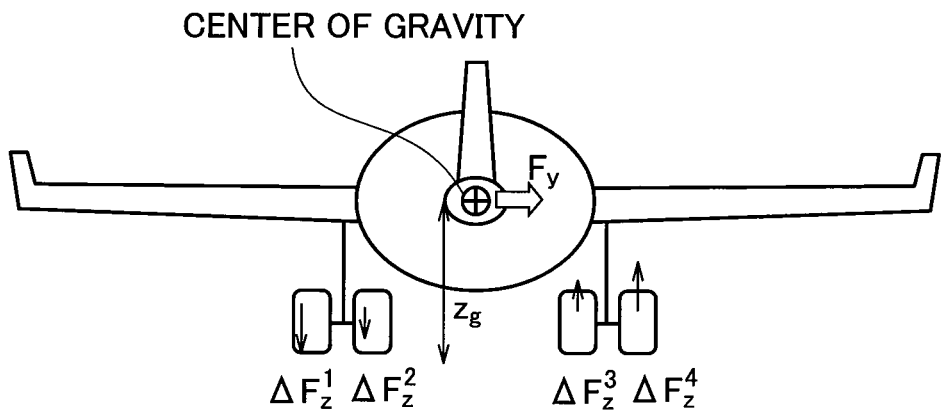
FIG. 13 is a back view for illustrating the dynamic load of the aircraft.

As illustrated in FIG. 13, when the load change of the respective aircraft tires is represented by $\Delta F_z^j$ (j: the mounted position of each aircraft tire), the following formula A19 and formula A20 need to be fulfilled in view of the balance of the acceleration in the right-left direction of the body with the moment, and the total weight of the body which is constant:

[Math. 19]

$$z_g F_y = \Sum_{j=1}^{N} \Delta F_z^j y^j \quad (A19)$$

[Math. 20]

$$\Sum_{j=1}^{N} \Delta F_z^j = 0 \quad (A20)$$

where j is the mounted position of each aircraft tire, N is the total number of the aircraft tries mounted on the main gear, Zg is the distance from the ground to the position of the center of gravity, and Fy is the moment due to the acceleration in the right-left direction of the body.

When the load shift is presumed to be proportional to the position in the right-left direction, the condition in which the total weight of the body is constant is fulfilled as long as the aircraft tires are symmetrically mounted, so as to fulfill the following formula A21:

[Math. 21]

$$\Delta F_z^j = \alpha_y y_j \quad (A21)$$

The following formula A22 is fulfilled due to the balance of the moment:

[Math. 22]

$$\alpha_y = \frac{z_g F_y}{\sum_{j=1}^{N} y_j^2} \quad (A22)$$

As described above, the wear amount estimation device 10 can calculate the load variation at the position of the corresponding aircraft tire caused by the acceleration in the right-left direction of the body.

The dynamic load (the change) caused due to the acceleration of the body is represented by the following formula A23 when using the load shift as described with reference to FIG. 12 and FIG. 13:

[Math. 23]

$$\Delta F_z^j = \alpha_x x_j + \beta_x + \alpha_y y_j = \frac{z_g F_x}{\left\{\sum_{j=1}^{N}(x^j)^2 - \frac{1}{N}\left(\sum_{j=1}^{N} x^j\right)^2\right\}} \cdot \left(x_j - \frac{\sum_{j=1}^{N} x^j}{N}\right) + \frac{z_g F_y}{\sum_{j=1}^{N} y_j^2} \cdot y_j \quad (A23)$$

For example, the wheel load acting on the respective aircraft tires of the main gear is represented by the following formula A24:

[Math. 24]

$$W^j = W_M^s + \Delta F_z^j = \\ W_M^s + \frac{z_g F_x}{\left\{\sum_{j=1}^{N}(x^j)^2 - \frac{1}{N}\left(\sum_{j=1}^{N} x^j\right)^2\right\}} \cdot \left(x_j - \frac{\sum_{j=1}^{N} x^j}{N}\right) + \frac{z_g F_y}{\sum_{j=1}^{N} y_j^2} \cdot y_j \quad (A24)$$

where $W_M^S$ is the wheel load with no acceleration in the front-rear direction or no acceleration in the right-left direction.

$W_M^S$ is given by the following formula A25:

[Math. 25]

$$W_M^s = \frac{W_M}{N} \quad (A25)$$

where N is the total number of the aircraft tires mounted on the main gear. As described above, the wheel load differs between the state of taxiing and the state of takeoff.

Figure 10:
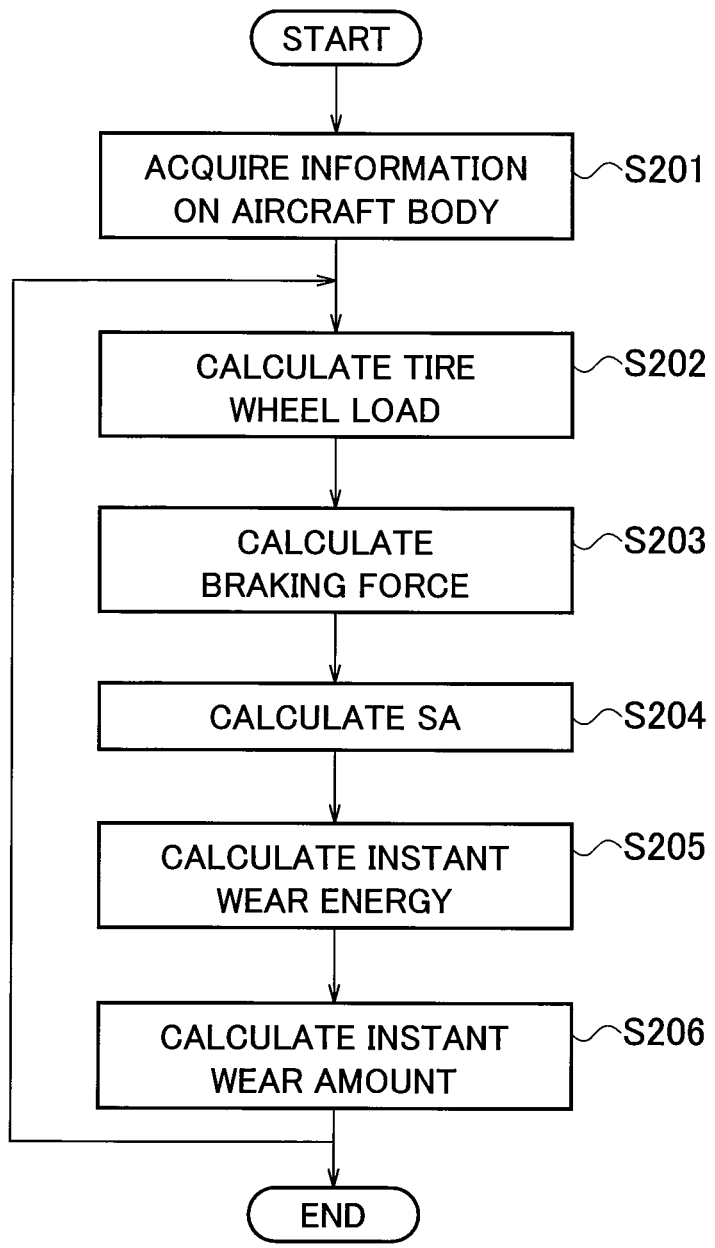
FIG. 10 is a flowchart for illustrating an operation of the wear amount estimation device according to the present embodiment of the present invention.

The process proceeds to step S203 shown in FIG. 10, and the wear amount estimation device 10 acquires the brake pressure of the aircraft to calculate the braking force. The method of calculating the braking force can be the same as described in step S102 shown in FIG. 2.

The process proceeds to step S204, and the wear amount estimation device 10 acquires the circling angle and the circling radius of the body, and the steering angle of the steering wheel so as to calculate the SA of the aircraft tires. The method of calculating the SA of the aircraft tires can be the same as a calculation method for a SA of automobile tires, and the specific explanations are not made below.

The process proceeds to step S205, and the wear amount estimation device 10 calculates instant wear energy $dE_w$. The instant wear energy $dE_w$ refers to wear energy generated during a quite short period of time dt, and is represented by the following formula A26 by use of the above formulas A3 to A7:

[Math. 26]

$$dE_w^i = E_P^i(P) \cdot E_L^i(L) \cdot E_V^i(V) \cdot \{E_{FR}^i + \Delta E_S^i(S) + \Delta E_B^i(B)\} \cdot \frac{Vdt}{2\pi r} \quad (A26)$$

where r is the circling radius of the body.

The wear energy $E_w$ generated during taxiing is obtained by integrating the formula A26 with the time T (a predetermined time) during which the aircraft is taxiing, and is represented by the following formula A27:

[Math. 27]

$$E_w^i = \int_0^T dE_w^i \quad (A27)$$

The formula A27 can be approximated by the following formula A28 when the sampling period is represented by $\Delta T$:

[Math. 28]

$$E_w^i = \\ \int_0^T dE_w^i \approx \Sigma E_P^i(P) \cdot E_L^i(L) \cdot E_V^i(V) \cdot \{E_{FR}^i + \Delta E_S^i(S) + \Delta E_B^i(B)\} \cdot \frac{V \Delta t}{2\pi r} \quad (A28)$$

The process proceeds to step S206, and the wear amount estimation device 10 calculates an instant wear amount dwear$^i$ of the aircraft tires based on the calculated instant wear energy $dE_w$. For example, the wear amount estimation device 10 can calculate the instant wear amount of the aircraft tires by use of the instant wear energy $dE_w$ and a wear resistance R. The wear resistance R is represented by the following formula A29 by use of wear energy E' per flight and the wear amount w' per flight calculated from the behavior of the body during an average flight (between an airport and an airport), for example. Namely, the wear resistance R indicates the relationship between predetermined wear energy and a predetermined wear amount.

[Math. 29]

$$E = \frac{E'}{w'} \quad (A29)$$

The instant wear amount $dwear^i$ of the aircraft tires is represented by the following formula A30:

[Math. 30]

$$dwear^i = \frac{dE_w^i}{R} \quad (A30)$$

The wear amount estimation device 10 repeatedly executes the process from step S202 to step S206 per quite short period of time dt, so as to calculate the wear amount $wear^i$ of the aircraft tires. The wear amount $wear^i$ of the aircraft tires during the time T in which the aircraft is taxiing is represented by the following formula A31:

[Math. 31]

$$wear^i = \frac{E_w^i}{R} \quad (A31)$$

(Operational Effects)

As described above, the wear amount estimation device 10 estimates the wear amount of the aircraft tires mounted on the aircraft in accordance with the internal pressure of the aircraft tires actually used, the load acting on the aircraft tires, the velocity of the aircraft, the slip angle caused in the aircraft tires, and the braking force of the aircraft tires. The wear amount estimation device 10 thus can estimate the wear amount of the aircraft tires with a high accuracy in the situation in which the aircraft tires are actually used. The information acquired from the airline 30 is information without RF tags attached to the aircraft tires. The wear amount estimation device 10 thus can accurately estimate the wear amount of the aircraft tires without RF tags attached to the aircraft tires.

The wear amount estimation device 10 calculates the wear energy $E_P$, the wear energy $E_L$, the wear energy $E_V$, the wear energy $\Delta E_S$, and the wear energy $\Delta E_B$ in accordance with the positions of the ribs of the aircraft tires in the state in which the aircraft tires are mounted on the aircraft. Each of the wear energy varies depending on the positions of the ribs. The wear amount estimation device 10 according to the present embodiment calculates each of the wear energy in accordance with the positions of the ribs, so as to accurately estimate the wear amount of the aircraft tires per position of each rib.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, the wear amount estimation device 10 has been illustrated with the case of acquiring the information on the aircraft from the airline 30, but is not limited to this case. The wear amount estimation device 10 may acquire the information on the aircraft from any element other than the aircraft 30.

REFERENCE SIGNS LIST

10 WEAR AMOUNT ESTIMATION DEVICE
11 COMMUNICATION UNIT
12 CALCULATION UNIT
13 ESTIMATION UNIT
20 NETWORK
30 AIRLINE
40 to 43 AIRCRAFT TIRE
50 to 53 RIB
60 CIRCUMFERENTIAL GROOVE

The invention claimed is:

1. A wear amount estimation method for estimating a wear amount of aircraft tires in a state of taxiing indicating a state in which an aircraft runs on a ground under a power of the aircraft, the state of taxiing including a state of a free rolling run indicating a state in which the aircraft runs straight by rolling without braking force acting on the aircraft tires, the method comprising:

calculating wear energy $E_P$, which depends on an internal pressure of the aircraft tires, in accordance with the internal pressure and wear energy $E_{FR}$ of the aircraft tires in the state of the free rolling run;

calculating wear energy $E_L$, which depends on a load acting on the aircraft tires, in accordance with the load and the wear energy $E_{FR}$;

calculating wear energy $E_V$, which depends on a velocity of the aircraft, in accordance with the velocity and the wear energy $E_{FR}$;

calculating wear energy $\Delta E_S$, which depends on a slip angle caused in the aircraft tires, in accordance with the slip angle and the wear energy $E_{FR}$;

calculating wear energy $\Delta E_B$, which depends on the braking force of the aircraft, in accordance with the braking force and the wear energy $E_{FR}$; and estimating the wear amount wear of the aircraft tires in accordance with the wear energy $E_P$, the wear energy $E_L$, the wear energy $E_V$, the wear energy $\Delta E_B$, the wear energy $\Delta E_B$, and a wear resistance R indicating a relationship between wear energy E' per flight and wear amount w' per flight.

2. The wear amount estimation method according to claim 1, further comprising:

calculating wear energy $E_W$ of the aircraft tires generated during a predetermined period of time in accordance with the wear energy $E_P$, the wear energy $E_L$, the wear energy $E_V$, the wear energy $\Delta E_S$, and the wear energy $\Delta E_B$; and estimating the wear amount wear of the aircraft tires such that the wear energy $E_W$ is divided by the wear resistance R.

3. The wear amount estimation method according to claim 1, further comprising calculating the wear energy $E_P$, the wear energy $E_L$, the wear energy $E_V$, the wear energy $\Delta E_S$, and the wear energy $\Delta E_B$ in accordance with a position of each rib of the respective aircraft tires in a state when the aircraft tires are mounted on the aircraft.

4. The wear amount estimation method according to claim 3, wherein, when the position of each rib of respective aircraft tires is represented by use of a variable i, the wear energy $E_P$ is calculated according to the following formula:

$$E_P^i(P) = a_P P^2 + b_P P + c_P$$

where P is the internal pressure, and $a_P$, $b_P$, and $c_P$ are constants, the wear energy $E_L$ is calculated according to the following formula:

$$E_L^i(L) = a_L L^2 + b_L L + c_L$$

where L is the load, and $a_L$, $b_L$, and $c_L$ are constants, the wear energy $E_V$ is calculated according to the following formula:

$$E_V^i(V) = a_V V^2 + b_V V + c_V$$

where V is the velocity, and $a_V$, $b_V$, and $c_V$ are constants, the wear energy $\Delta E_S$ is calculated according to the following formula:

$$\Delta E_S^i(SA) = a_S(SA)^2 b_S(SA) + c_S - E_{FR}$$

where SA is the slip angle, and $a_S$, $b_S$, and $c_S$ are constants, the wear energy $\Delta E_B$ is calculated according to the following formula:

$$\Delta E_B^i(G_X^{BR}) = a_B(G_X^{BR})^2 + b_B(G_X^{BR}) + c_B - E_{FR}$$

where $G_X^{BR}$ is the braking force, and $a_B$, $b_B$, and $c_B$ are constants, the wear energy $E_W$ is calculated according to the following formula:

$$E_w^i = \Sigma E_P^i(P) \cdot E_L^i(L) \cdot E_V^i(V) \cdot \{E_{FR}^i + \Delta E_S^i(S) + \Delta E_B^i(B)\} \cdot \frac{V \Delta t}{2 \pi r}$$

where $\Delta t$ is the predetermined period of time, and r is a circling radius of the aircraft, and the wear amount $wear^i$ of the aircraft tires is estimated according to the following formula:

$$wear^i = \frac{E_w^i}{R}$$

where R is the wear resistance.

5. The wear amount estimation method according to claim 1, wherein the internal pressure and the velocity are acquired from an airline.

6. A wear amount estimation device for estimating a wear amount of aircraft tires in a state of taxiing indicating a state in which an aircraft runs on a ground under a power of the aircraft, the state of taxiing including a state of a free rolling run indicating a state in which the aircraft runs straight by rolling without braking force acting on the aircraft tires, the device comprising:

a calculation unit configured to calculate wear energy $E_P$, which depends on an internal pressure of the aircraft tires, in accordance with the internal pressure and wear energy $E_{FR}$ of the aircraft tires in the state of the free rolling run; and an estimation unit configured to estimate the wear mount wear of the aircraft tires, the calculation unit being configured to:

calculate wear energy $E_L$, which depends on a load acting on the aircraft tires, in accordance with the load and the wear energy $E_{FR}$;

calculate wear energy $E_V$, which depends on a velocity of the aircraft, in accordance with the velocity and the wear energy $E_{FR}$;

calculate wear energy $\Delta E_S$, which depends on a slip angle caused in the aircraft tires, in accordance with the slip angle and the wear energy $E_{FR}$; and calculate wear energy $\Delta E_B$, which depends on the braking force of the aircraft, in accordance with the braking force and the wear energy $E_{FR}$, the estimation unit being configured to estimate the wear amount wear of the aircraft tires in accordance with the wear energy $E_P$, the wear energy $E_L$, the wear energy $E_V$, the wear energy $\Delta E_S$, the wear energy $\Delta E_B$, and a wear resistance R indicating a relationship between E' per flight wear energy and a wear amount w' per flight.

7. A non-transitory computer-readable storage medium storing a wear amount estimation program for estimating a wear amount of aircraft tires in a state of taxiing indicating a state in which an aircraft runs on a ground under a power of the aircraft, the state of taxiing including a state of a free rolling run indicating a state in which the aircraft runs straight by rolling without braking force acting on the aircraft tires, the program causing a computer of a terminal device to execute the steps of:

calculating wear energy $E_P$, which depends on an internal pressure of the aircraft tires, in accordance with the internal pressure and wear energy $E_{FR}$ of the aircraft tires in the state of the free rolling run;

calculating wear energy $E_L$, which depends on a load acting on the aircraft tires, in accordance with the load and the wear energy $E_{FR}$;

calculating wear energy $E_V$, which depends on a velocity of the aircraft, in accordance with the velocity and the wear energy $E_{FR}$;

calculating wear energy $\Delta E_S$, which depends on a slip angle caused in the aircraft tires, in accordance with the slip angle and the wear energy $E_{FR}$;

calculating wear energy $\Delta E_B$, which depends on the braking force of the aircraft, in accordance with the braking force and the wear energy $E_{FR}$; and estimating the wear amount wear of the aircraft tires in accordance with the wear energy $E_P$, the wear energy $E_L$, the wear energy $E_V$, the wear energy $\Delta E_S$, the wear energy $\Delta E_B$, and a wear resistance R indicating a relationship between wear energy E' per flight and a wear amount w' per flight.

* * * * *